(12) United States Patent
Sawai

(10) Patent No.: US 6,513,797 B2
(45) Date of Patent: Feb. 4, 2003

(54) DAMPING ARRANGEMENT FOR SUSPENSION SYSTEM

(75) Inventor: Seiji Sawai, Shizuoka (JP)

(73) Assignee: Yamaha Hatsudoki Kabushiki Kaisha (JP)

(*) Notice: Subject to any disclaimer, the term of this patent is extended or adjusted under 35 U.S.C. 154(b) by 0 days.

(21) Appl. No.: 09/829,262

(22) Filed: Apr. 9, 2001

(65) Prior Publication Data

US 2002/0033094 A1 Mar. 21, 2002

(30) Foreign Application Priority Data

Apr. 10, 2000 (JP) .................................. 2000-108326

(51) Int. Cl.[7] .............................. B60G 17/00; F16F 5/00
(52) U.S. Cl. ................. 267/64.16; 267/220; 267/64.13; 267/64.25; 188/322.17
(58) Field of Search ................. 188/269, 322.16, 188/322.17, 322.19; 267/195, 217, 218, 219, 220, 292, 293, 64.11, 64.13, 64.15, 64.16, 64.17, 64.19, 64.25, 64.27

(56) References Cited

U.S. PATENT DOCUMENTS

| | | | | |
|---|---|---|---|---|
| 3,203,511 A | * | 8/1965 | Long, Jr. .................... 188/315 |
| 4,044,866 A | * | 8/1977 | Ishida .................... 188/322.17 |
| 4,079,925 A | * | 3/1978 | Salin ..................... 188/322.16 |
| 4,108,423 A | * | 8/1978 | Skubal ....................... 188/276 |
| 4,194,731 A | | 3/1980 | Marx |
| 4,548,389 A | | 10/1985 | Smith et al. |
| 4,736,824 A | * | 4/1988 | Dony et al. ............. 188/322.17 |
| 4,771,996 A | * | 9/1988 | Martinez et al. ........ 188/321.11 |
| 4,788,747 A | | 12/1988 | Ludwig |
| 5,114,176 A | | 5/1992 | Sawai |
| 5,224,573 A | * | 7/1993 | Amemiya et al. .......... 188/315 |
| 5,485,987 A | * | 1/1996 | Jobelius et al. ........ 188/322.17 |
| 5,584,368 A | * | 12/1996 | Larsson ................. 188/322.16 |
| 5,735,371 A | * | 4/1998 | Jobelius et al. ............. 188/276 |
| 5,794,743 A | * | 8/1998 | Pradel et al. .......... 188/322.16 |
| 6,044,940 A | * | 4/2000 | Marzocchi et al. ...... 188/299.1 |
| 6,176,492 B1 | | 1/2001 | Sawai |

FOREIGN PATENT DOCUMENTS

| | | | | |
|---|---|---|---|---|
| EP | 0695658 | * | 2/1996 | ............ 188/322.16 |
| EP | 0 695 658 | | 7/1996 | |
| EP | 0 855 296 | | 7/1998 | |
| EP | 0 884 499 | | 12/1998 | |
| EP | 11291737 | | 10/1999 | |
| EP | 0702166 | * | 12/1999 | ............ 188/322.16 |
| EP | 1 146 247 | | 10/2001 | |
| EP | 1 149 716 | | 10/2001 | |
| FR | 2611605 | | 2/1987 | |
| GB | 1072495 | | 6/1967 | |

* cited by examiner

Primary Examiner—Christopher P. Schwartz
Assistant Examiner—Devon Kramer
(74) Attorney, Agent, or Firm—Knobbe, Martens, Olson & Bear, LLP

(57) ABSTRACT

A damper comprises a first chamber and a second chamber separated by a piston. At least one of the chambers includes an axially moveable member and an axially fixed member. A resilient or compressible member is positioned between the axially moveable member and the axially fixed member. The axially moveable member is displaced toward the fixed member during slight pressure increases to absorb small pressure fluctuations that may be insufficient to cause flow through the piston.

23 Claims, 9 Drawing Sheets

DAMPING ARRANGEMENT FOR SUSPENSION SYSTEM

RELATED APPLICATIONS

This application is related to and claims priority from Japanese Patent Application No. HEI 2000–108,326, which was filed on Apr. 10, 2000, the entire contents of which is hereby incorporated by reference.

BACKGROUND OF THE INVENTION

1. Field of the Invention

The present invention generally relates to dampers for vehicular suspension systems. More particularly, the present invention relates to dampers configured with an internally moveable component to reduce the effects of small scale, rapid movements upon the vehicle.

2. Description of the Related Art

Vehicles are provided with suspension systems to reduce the effects of bumps and irregularities in the surfaces over which they are operating. The same suspension systems act to place the wheels or other suspended members (i.e., skis and the like) in firm contact with the operating surface such that operator control can be increased.

The suspension systems often comprise hydraulic dampers that are interconnected in any of a number of manners. The hydraulic dampers generally comprise a cylinder further comprising a first chamber and a second chamber with a fluid connection extending through a piston that divides the first chamber from the second chamber. The cylinder is often connected to either the frame of the vehicle or the suspended member (i.e., the wheel, the ski or the like) while the piston is connected to the other.

For illustrative purposes, the cylinder can be connected to the vehicle's frame while the piston is connected to the wheel. When the wheel moves downward relative to the vehicle frame, the piston and the cylinder move such that the unit lengthens. Due to this movement, the movement of the piston reduces the volume in the first chamber and increases the volume in the second chamber. The fluid within the first chamber, thus, is displaced through valves that control flow through the fluid connection between the first chamber and the second chamber. The valves restrict the flow to some degree. When the wheel moves upward relative to the vehicle frame, the piston and the cylinder move such that the unit contracts. Due to this movement, the movement of the piston within the cylinder reduces the volume in the second chamber and increases the volume in the first chamber. Once again, fluid is displaced through valves positioned in the piston and the movement is damped by the restricted flow.

The restricted flow and damping action is controlled by the type of throttling employed by the valves between the chambers. To create a large damping force, a first type of valve is required that decreases the flow rate (i.e., a stiff suspension) and, to create a small damping force, a different type of valve is required that increases the flow rate (i.e., a soft suspension). If the suspension system is configured to be stiff (i.e., the flow rate is decreased) then relatively small bumps are easily transferred to the vehicle frame from the wheels. Of course, if the suspension system is configured to be soft (i.e., the flow rate is increased) then the vehicle will operate between the bump stops of the suspension components, which adversely impacts longevity of the components.

SUMMARY OF THE INVENTION

Accordingly, a suspension damper is desired that can provide stiffer action to reduce the larger ranges of movement caused by larger bumps while suitably absorbing smaller ranges of movement caused by smaller bumps.

One aspect of the present invention involves a damper for a suspension system. The damper comprises a cylinder body with a moveable wall disposed within the cylinder body. The cylinder body comprises an outer wall and an end cap with the end cap enclosing a first end of the cylinder. A first chamber is at least partially defined by the outer wall and the moveable wall and a second chamber is at least partially defined by the outer wall, the end cap and the moveable wall. An axially moveable member is positioned within a portion of the second chamber and a compressible member is disposed generally between the moveable member and the end cap. The compressible member has one surface generally fixed in an axial location relative to the end cap.

Another aspect of the present invention involves a hydraulic damper comprising a cylinder body with a piston reciprocal within the cylinder body. A first chamber is defined on a first side of the piston and a second chamber defined on a second side of the piston. The piston comprises at least one passage connecting the first chamber and the second chamber. A pressure-responsive valve regulates flow through the at least one passage. A piston rod is connected to the piston and extends through an end of the cylinder body. A disk is positioned between the end of the cylinder body and the piston. The disk also interposed between a stop and the piston with a compressible member being interposed between at least a portion of the disk and the stop.

BRIEF DESCRIPTION OF THE DRAWINGS

These and other features, aspects and advantages of the present invention will be described with reference to several drawings. The drawings illustrate three preferred arrangements of the present invention. The present invention is not limited to the three preferred arrangements and certain features, aspects and advantages of each of the three arrangements can be used in the other two arrangements. The drawings comprise nine figures.

DETAILED DESCRIPTION OF THE PREFERRED ARRANGEMENTS

Figure 1:
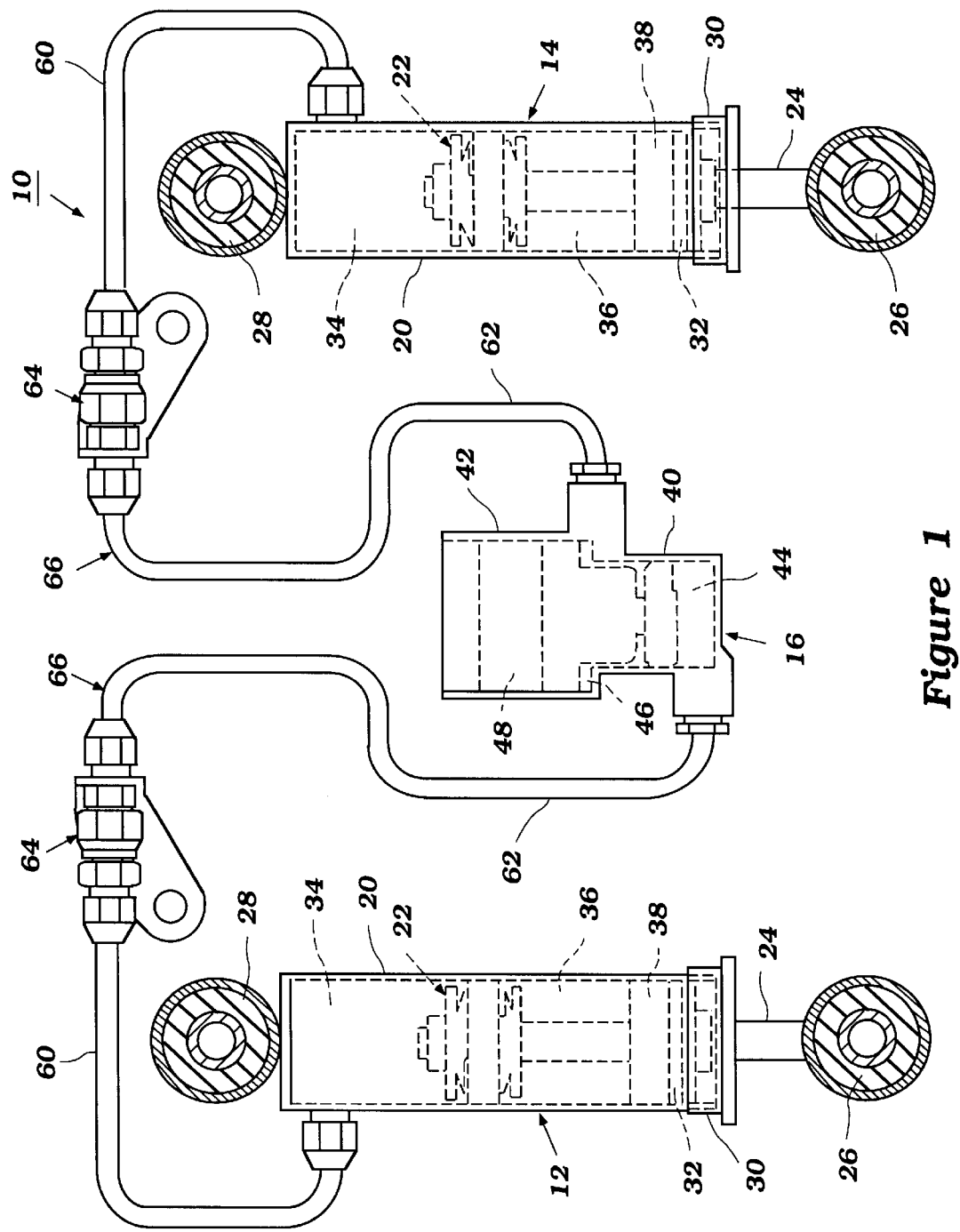
FIG. 1 is a simplified cross sectional view of a suspension system employing dampers having certain features, aspects and advantages in accordance with the present invention.

With reference initially to FIG. 1, a suspension system 10 arranged and configured in accordance with certain features, aspects and advantages of the present invention is illustrated therein. The present suspension system 10 can be used with any number of vehicle types. For instance, the present suspension system can be used with automobiles, trucks, light duty vehicles, off road vehicles, motorcycles, snowmobiles, golf cars and the like. Other applications will become apparent to those of ordinary skill in the art.

The suspension system 10 generally comprises at least one damper, and preferably at least a first damper 12 and a second damper 14. In some configurations, the suspension system 10 can comprise four dampers such that a single damper is positioned at each wheel or at each corner of the vehicle. In the illustrated arrangement, the first damper 12 and the second damper 14 are similarly constructed and, to simplify the description, only the components of the first damper 12 will be described. Of course, because the two dampers 12, 14 are similarly constructed in the illustrated arrangement, the description of the first damper 12 will also apply to the second damper 14. In some arrangements, however, the construction of the two dampers can vary from each other.

In the illustrated suspension system, the first damper 12 and the second damper 14 are interconnected through a pressure regulator 16. Thus, the illustrated arrangement comprises an interconnected'suspension system in which two or more dampers can be connected through an intermediate member. The pressure regulator 16, which is the presently preferred intermediate member, allows the action of the two dampers 12, 14 in the illustrated arrangement to be coordinated. In this manner, depending upon the placement and relationship of the interrelated dampers, the two dampers can be used to control or reduce pitching, rolling and other similar handling movements of the vehicle.

The first damper 12 generally comprises an outer cylinder 20 and a piston 22. The piston 22 is sized and configured for sliding movement with the cylinder 20. In addition, the piston 22 is mounted to a piston rod 24, which extends from a first end of the cylinder 20.

In the illustrated arrangement, the piston rod 24 and the cylinder 20 are connected between a vehicle frame (not shown) and a suspended member, such as a wheel (not shown) through the use of a first mount 26 and a second mount 28. The particular mounting configuration is not important and either the piston rod 24 or the cylinder 20 can be mounted to the vehicle frame depending upon the application. In the illustrated arrangement, the cylinder 20 is mounted to the frame using the second mount 28.

The mounts 26, 28 generally comprise outer casings and inner casings that are interconnected with a shock-absorbing material, such as rubber. The outer casings and the inner casings are capable of slight relative movement and the material interconnecting the casings serves to damp vibrations in some arrangements. Of course, any suitable mount arrangement can be used.

The end of the cylinder 20 opposite the piston rod 24 is generally closed in any suitable manner. In some arrangements, the cylinder is drawn or otherwise formed with a closed end. In a preferred arrangement, an end plate is formed and secured to the cylinder, such as through welding or the like.

The other end of the cylinder 20 preferably is closed with a cover plate 30. In the illustrated arrangement, the cover plate 30 extends over a portion of the cylinder 20 and can be attached to the cylinder in any suitable manner. The cover plate 30 preferably provides a rather centralized aperture through which the piston rod 24 can reciprocate. A stop 32, which will be described in greater detail below, preferably is provided generally adjacent the cover plate 30 inside of the cylinder 20.

The piston 22, in cooperation with the cylinder 20, defines two variable volume chambers, an upper chamber 34 and a lower chamber 36. Movement of the piston 22 generally varies the volumes within the chambers 34, 36 and the volume defined by the two chambers together also varies due to the volume of the lower chamber 36 displaced by the piston rod 24 during movement of the associated piston 22.

Preferably, as will be described in further detail below, a compressible member, such as a rubber damper 38, is disposed between one of the chambers, such as the lower chamber 36 and the associated end of the cylinder, such as the cover plate 30. Advantageously, the rubber damper 38 allows a small degree of relative volumetric variation to occur within the associated chamber without causing flow through the piston 22.

In the illustrated arrangement, the chambers not associated with the compressible members (i.e., the rubber dampers 38) of the dampers 12, 14 are interconnected to each other through the pressure regulator 16. The pressure regulator 16 generally comprises a first cylinder portion 40 and a second cylinder portion 42. The first cylinder portion 40 generally defines a first chamber 44 while the second cylinder portion 42 generally defines a second chamber 46 and a gas chamber 48.

Figure 3:
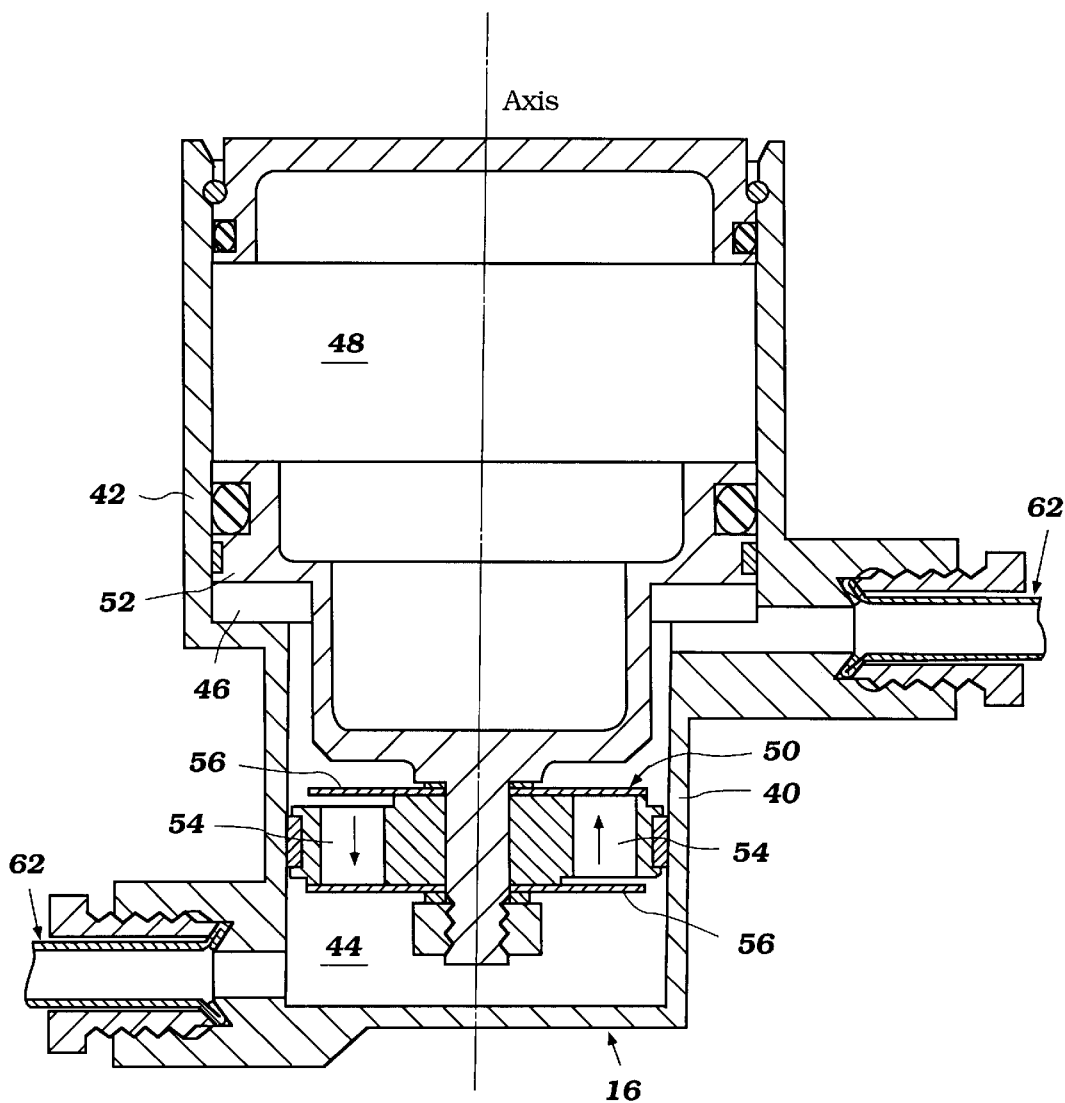
FIG. 3 is an enlarged cross-sectional view of a pressure regulator from the suspension system of FIG. 1.

With reference now to FIG. 3, the pressure regulator 16 will be described in further detail. The pressure regulator generally comprises a moveable piston 50 that is carried by a moveable piston rod 52. The piston 50 and the piston rod 52 are capable of translation within the housing of the pressure regulator (i.e., the first cylinder portion 40 and the second cylinder portion 42).

The piston 50 contains a number of valved apertures 54. In general, the apertures a selectively opened and closed by a pair of valve discs 56 disposed on opposing ends of the piston 50. These valve discs 56 allow communication between the first chamber 44 and the second chamber 46 through selected apertures 54 during movement of the piston 50. In particular, as indicated by the arrows, a first set of apertures 54 connects the first chamber 44 to the second chamber 46 and a second set of apertures 54 connects the second chamber 46 to the first chamber 44. Thus, the flow rates between the two chambers 44, 46 can be controlled based on flow direction if desired.

In the illustrated arrangement, the first cylinder portion 40 and the second cylinder portion 42 have unequal diameters. The unequal diameters allow the volumetric variation in both chambers to be consistent between even though one chamber 46 includes the piston rod 52. Thus, the same volumetric input from the associated damper will result in the same amount of displacement of the piston 50 and piston rod 52. Of course, any suitable pressure regulator can be used. In addition, in some applications, an accumulator can be used in replace of, or in addition to, the pressure regulator 16.

In the illustrated arrangement, a first conduit 60 and a second conduit 62 connect the first damper 14 to the pressure regulator 16. The second damper is similarly connected to the pressure regulator and, for simplicity of description, the connection will be described using the same reference numerals. A fluid line coupling 64 couples the first conduit 60 and the second conduit 62 together such that the first conduit 60, the second conduit 62, and the coupling 64 combine to form a fluid passage 66. Any suitable coupling 64 can be used; however, two arrangements of preferred couplings 64 will be described. Advantageously, the coupling 64 limits back flow, and desirably substantially eliminates leakage, when the two conduits 60, 62 are separated at the coupling 64. Preferably, the coupling 64 is constructed to prevent substantial leakage when the conduits 60, 62, which contain fluid under pressure, are separated.

Figure 4:
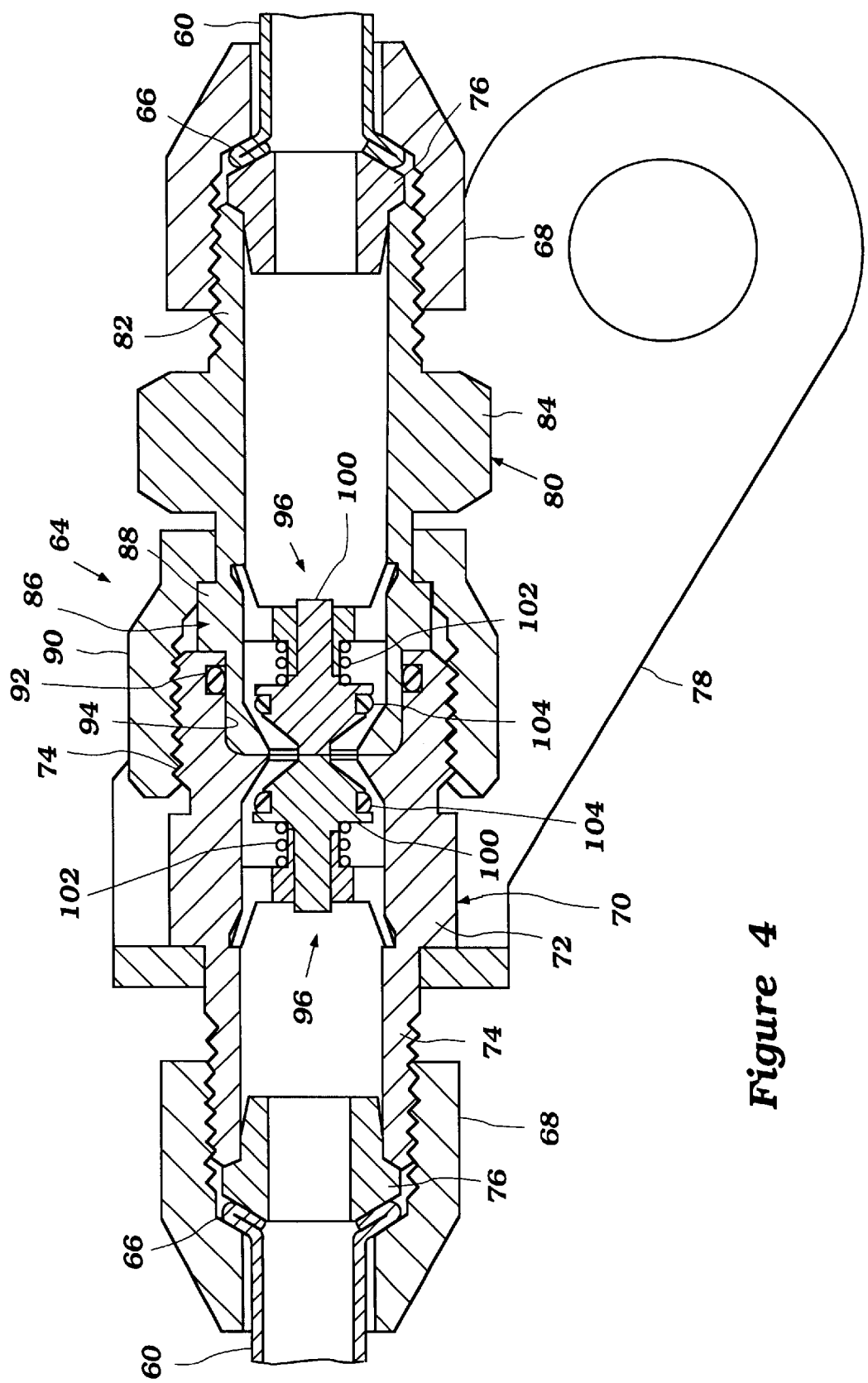
FIG. 4 is a greatly enlarged cross-sectional view of a fluid line coupling from the suspension system of FIG. 1.

With reference now to FIG. 4, a first coupling 64 will be described in greater detail. The conduits 60, 62 each generally comprise a flared end 66. In the illustrated arrangement, the flared end 66 is rolled inward over itself such that the respective conduit is doubled over at the end. Preferably, the flared end 66 is angled outward and expands the diameter of the end of the conduit. Of course, other conduit ends also can be used.

With continued reference to FIG. 4, a nut 68 is disposed upstream on the conduit of the flared end 66. The smallest inner diameter of the nut 68 is slightly larger than the respective conduit and slightly smaller than the outer diameter of the flared end 66. In effect, the flared end 66 secures the nut 68 on the conduit such that, when the nut is not tightened into position on the coupler 64, the nut does not easily separate from the conduit. An interior surface of the nut 68 contains threads that are sized and configured to mesh with exterior threads formed on a double male-ended socket 70. Thus, the nut 68 can be tightened to the socket 70.

Figure 5:
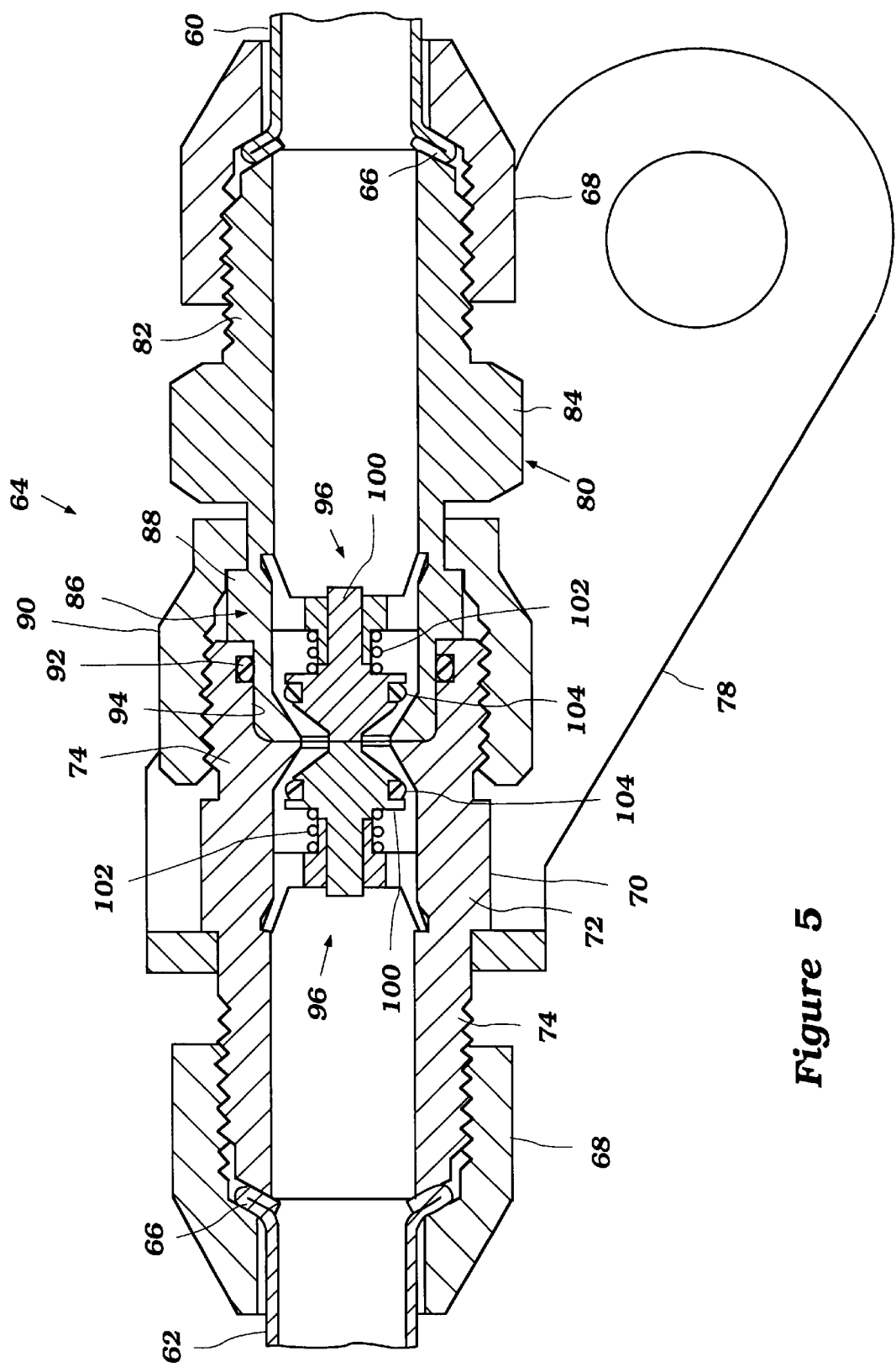
FIG. 5 is a greatly enlarged cross-sectional view of another fluid line coupling from the suspension system of FIG. 1.

The socket 70 preferably comprises a central boss section 72 and a pair of outwardly extending threaded sections 74. A first of the threaded sections 74 is sized and configured to be secured to the flared end 66 of the conduit. In some arrangements, such as that illustrated in FIG. 5, the flared end 66 and the threaded section 74 come into direct contact. In other arrangements, the flared end 66 and the threaded section 74 can be separated by an intermediate member. For instance, a flow restricting sleeve 76 can be secured in position in some configurations. Preferably, an intermediate member, such as the sleeve 76, contains an outward extension that can mate with both the socket 70 and the nut 68. The mating arrangement between the components advantageously has an increased contact surface area to increase the amount of pressure that can be sealed within the conduit and socket combination.

Preferably, the socket 70 extends through an aperture formed in a mounting bracket 78. The socket 70, and the associated conduits 60, 62 can be secured in position on the vehicle when the mounting bracket 78 is installed and the nut 68 is tightened on the socket 70. Although in the illustrated arrangement, a substantial amount of axial movement between the socket 70 and the bracket 78 is accommodated, the amount of movement can be restricted. In some arrangements, a resilient buffer member can be used to reduce frame originating vibrations from passing to the lines through the bracket 78.

With continued reference to FIG. 4, a plug 80 preferably is secured to the other nut 68. The plug preferably is similarly configured to the socket 70. The plug 80, however, preferably comprises a threaded end 82 that is received by the nut 68, an increased diameter central boss portion 84 and a blank stepped end 86.

The stepped end 86 advantageously comprises an outwardly extending ring 88 that is spaced from the boss portion 84. An internally threaded nut 90 is secured to the plug 80 and can be tightened to the threaded end 74 of the socket 70 such that the socket 70 and the plug 80 are connected by the nut 90. The nut 90 preferably includes a ring channel that receives an O-ring or other suitable seal configuration 92. Of course, in some configurations, the plug can include a ring channel for such a seal.

The stepped end 86 preferably is received within a recess 94 formed within the end of the socket 70. The fit between the components is advantageously a sliding fit and the seal configuration 92 substantially seals the connection from fluid leakage. Of course, other suitable substantially fluid-tight connections also can be used.

With continued reference to FIG. 4, the socket 70 and the plug 80 each receives a flow control assembly 96. Advantageously, the flow control assembly 96 deploys a flow stopping valve in each conduit 60, 62 when the conduits are disconnected. The illustrated flow control assembly 96 generally comprises a holder 98, a valve disc 100 and a biasing member 102.

Preferably, the holder 98 is sized and configured to be secured inside a lumen defined within the socket 70 or within the plug 80. The holder desirably is generally restrained from axial movement in either direction, such as through an expanded section that engages within a channel race formed in the inner wall defining the lumen. The expanded section can be a plurality of fingers that snap into position when slid into place within the lumen. Of course, other constructions also can be used.

The valve disc 100 extends through a central aperture of the holder 98. It should be noted that the holder 98 also comprises a number of fluid passages to allow fluid to pass through the holder 98 and the fluid passages are spaced about the central aperture in any suitable configuration. The valve disc comprises a sloping cone face that terminates at a ring groove. The ring groove hosts an O-ring or any suitable seal member 104. In addition, the valve disc 100 is sized to be retained within the space defined between an inwardly sloping surface of the inner wall of the socket 70 and the holder 98. Thus, the valve disc 100 is generally captured in position.

The seal member 104 is urged against the inwardly sloping surface of the inner wall of the socket to seal against fluid leaks. While the fluid pressure could be used to provide the sealing action in some arrangements, the biasing member 102 forceably seals the opening with the seal member 104 and the valve disc 100 when the conduits are separated. In addition, the valve discs 100 each include a contact face that extends forward from the socket 70 and the plug 80 respectively such that during coupling, the valve discs 100 are urged away from the respective forward inner walls and the seals 104 are retracted to allow fluid flow.

Thus, the socket 70 preferably remains connected to the conduit 60 while the plug 80 preferably remains connected to the conduit 62 when the hydraulic system is charged with fluid pressure. In this manner, the nut 90 and the socket 70 can be used to couple and uncouple the conduits 60, 62 without substantial leakage of the fluid contained within the suspension system 10.

With reference now to FIGS. 1, 2 and 6–9, several damper arrangements will be described in greater detail. In general, each of the arrangements has several components in common with the other arrangements. Thus, to simplify the description of the various arrangements, the common structures will first be described. This description applies to each of the arrangements in FIGS. 1, 2 and 6–9. It should be noted that, while not explicitly illustrated and described, the dampers can vary from this common description in some applications.

Generally speaking, each damper comprises the construction described above with respect to FIG. 1. The cylinder 12 comprises a cylinder body 110 that is generally cylindrical in most applications. The piston 22, which reciprocates within the cylinder body 110 preferably comprises a number of axial apertures 112 that provide fluid communication between the upper chamber 34 and the lower chamber 36.

The apertures 112 can be selectively opened and closed by a valve disc configuration. In the illustrated arrangement, a first set of apertures 112 allow flow from the upper chamber 34 to the lower chamber 36 while the a second set of apertures 112 allow flow from the lower chamber 36 to the upper chamber 34. In other words, an upper valve disc assembly 114 selectively closes the second set of apertures 112 while a lower valve disc assembly 116 selectively closes the first set of apertures 112.

Preferably a fluid connection 118 is provided to the conduit 60. The fluid connection desirably is in one chamber, such as the upper chamber 34, while the compressible member 38 is disposed adjacent or in the other chamber, such as the lower chamber 36.

Figure 2:
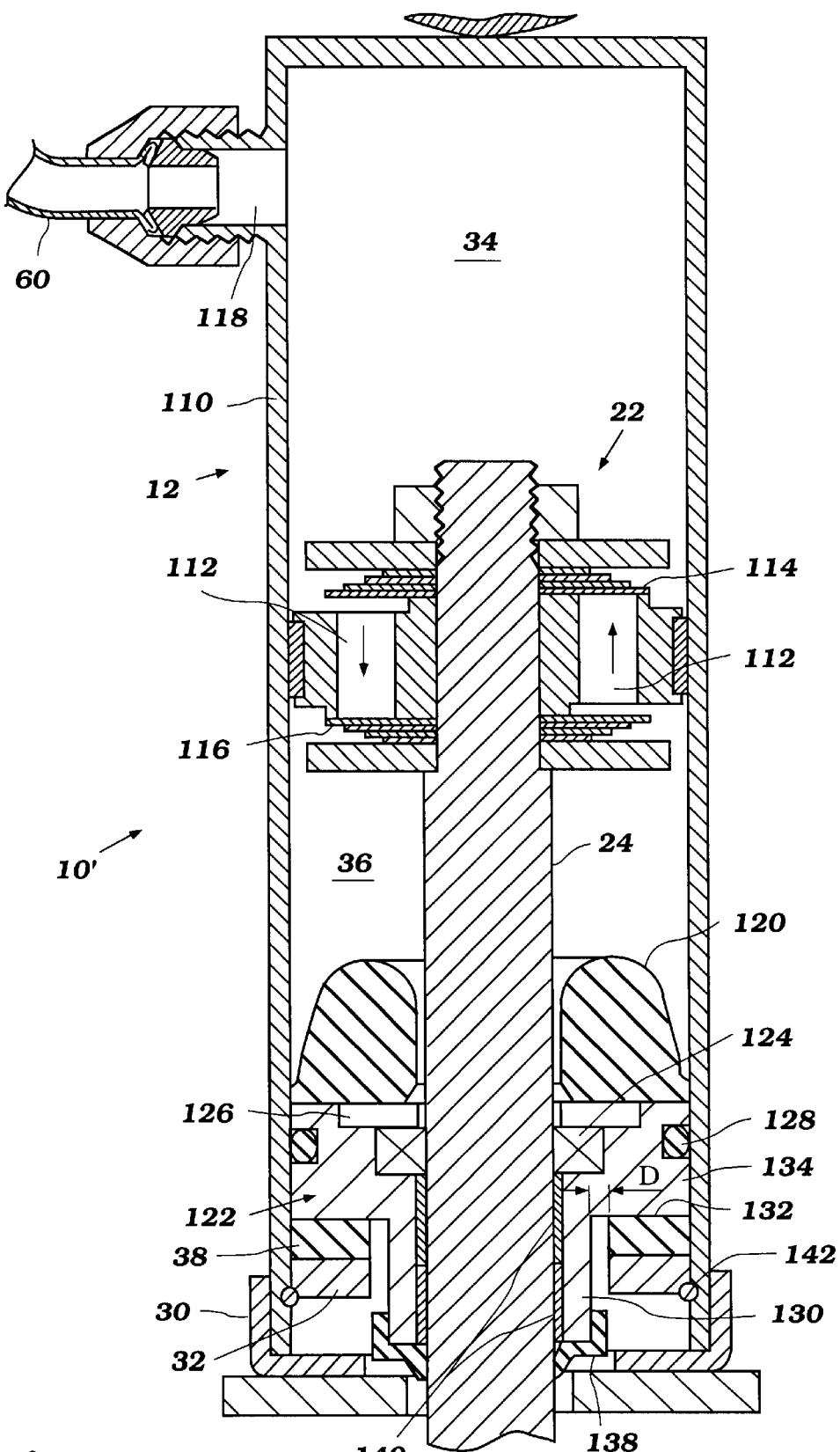
FIG. 2 is an enlarged cross-sectional view of a single damper from the suspension system of FIG. 1.

With reference now to FIG. 2, additional components of a first arrangement of a presently preferred damper 12 will be described. The damper 12 preferably also comprises a dust seal 120. In the illustrated arrangement, the dust seal is disposed above the compressible member 38 and below the piston 22.

The dust seal 120 is disposed atop of a slightly axially moveable disk 122. The disk is disposed in sliding relationship with the cylinder body 110. The disk 122 can slide along an axial center A of the damper 12. Preferably, the disk 122 contains a recess proximate the dust seal 120 that receives an oil sealing member 124. Advantageously, the sealing member 124 seals against the piston rod 24 while allowing the piston rod 24 to translate axially within the cylinder body 110 relative to the disk 122. In addition, a washer 126, snap ring or other retaining component is disposed within a recess adjacent to the sealing member 124 that helps maintain the relative positioning of the sealing member 124 relative to the disk 122 and the dust seal 120.

An outer surface of the disk 122 contains a ring groove. The ring groove receives an O-ring or other suitable sealing member 128. The O-ring 128 seats against the cylinder body 110 and reduces or eliminates fluid flow past the outer surface of the disk between the disk and the cylinder body 110. Of course, as with most of the O-rings in the illustrated arrangement, lipped seals can be used as well.

With continued reference to FIG. 2, the disk 122 further comprises a reduced diameter portion 130 disposed on a side opposite the lower chamber 36. The reduced diameter portion 130 has a first diameter and a stepped surface 132 is defined at the junction of the reduced diameter portion and the larger diameter portion 134, which contains the O-ring groove in the illustrated arrangement. Of course, the reduced diameter portion and the larger diameter portion can be separate members in some applications.

While not described above, the stop 32 and the compressible member 38 are generally ring-shaped. In other words, these members 32, 38 have an aperture that accommodates the piston rod 24 and that defines an inner diameter and an outer diameter that closely matches the inner diameter of the cylinder body 110. The inner diameter of these members 32, 38, in the illustrated arrangement of FIG. 2, is slightly larger than the outer diameter of the reduced diameter portion 130 of the disk 122. Thus, a distance D is defined between these two diameters. The distance D preferably is such that, when the compressible member 38 is fully compressed, the lateral displacement of the material forming the compressible member 38 does not result in the laterally displaced material contacting the reduced diameter portion 130 of the disk 122. As used herein, fully compressed does not necessarily imply compressed to the limit of the material used in forming the compressible member. Rather, fully compressed also may cover compression degrees that are the maximum compression that will occur during normal use. To indicate compression to the limit of the material, such a phrase will be used.

With continued reference to FIG. 2, a dust seal 138 preferably is disposed at an end of the reduced diameter portion 132 of the disk 122 and the dust seal 138 preferably reduces the entrance of dust, dirt, mud, water and the like into the damper 112. Thus, the dust seal 138 preferably is positioned close to the opening in the cylinder 12 through which the piston rod 24 extends. Additionally, a set of linear bearings 140 or a set of bushings preferably are positioned between the piston rod 24 and the disk 122 to facilitate sliding movement between these components and to reduce friction induced wear on these components.

Thus, in use, the valve discs 114, 116 associated with the piston 22 can be selected for a rather stiff suspension. Nevertheless, as the vehicle encounters rather small bumps, the smaller movements of the suspension system are absorbed by compressing the compressible member 38, which is mounted between the disk 122 and the stop 32. Incidentally, the stop 32 can be secured in position in any suitable manner and, in the illustrated arrangement, is held in position by a snap ring 142. Thus, as small amounts of pressure develop within the lower chamber 36, which is not connected to the pressure regulator 16, the disk 122 is depressed toward the stop 32 which squeezes the compressible member 38. Thus, some of the lower level pressure changes are accommodated by the compressible member.

It is believed that by varying the compressible member material and size the amount of pressure absorbed by the compressible member can be varied. In this regard, the upper level of pressure absorbable by the compressible member also can be controlled by configuring the valve discs to open such that an overlap between the maximum pressure tolerable by the compressible member is higher than the lowest pressure needed to open the valves formed in the piston.

Figure 6:
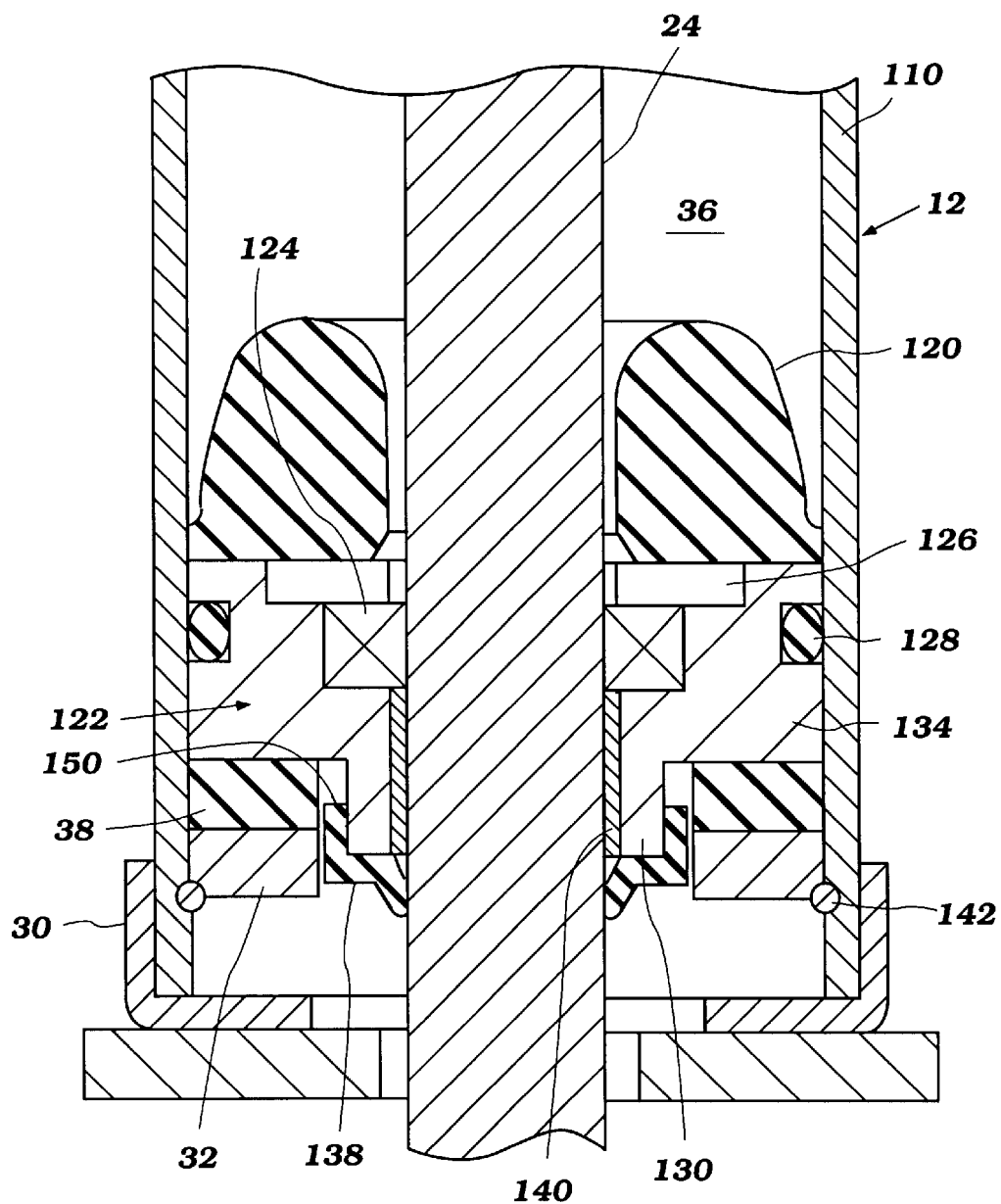
FIG. 6 is a greatly enlarged cross-sectional view of another damper arranged and configured in accordance with certain features, aspects and advantages of the present invention.

With reference now to FIG. 6, another arrangement is illustrated therein. In this arrangement, the components have retained like reference numerals and the above description applies; however, the particular geometric relationship between the dust seal 138, the reduced diameter portion 130 of the disk 122 and the compressible member 38 has been varied. In particular, rather than providing a clear channel between the compressible member 38 and the reduced diameter portion 130 of the disk 122, the assembly of the damper advantageously has been compacted and the length of the reduced diameter portion has been reduced.

In the construction of FIG. 6, the upper lip 150 of the dust seal 138 advantageously is positioned such that, upon maximum deflection, the material of the compressible member 38 bulges inward and generally does not contact the outer edge of the upper lip 150. In some arrangements, slight contact may be made between the outer edge of the upper lip 150 and the compressible member 38. Preferably, however, the dust seal does not limit the inward bulging of the compressible member 38.

Figure 7:
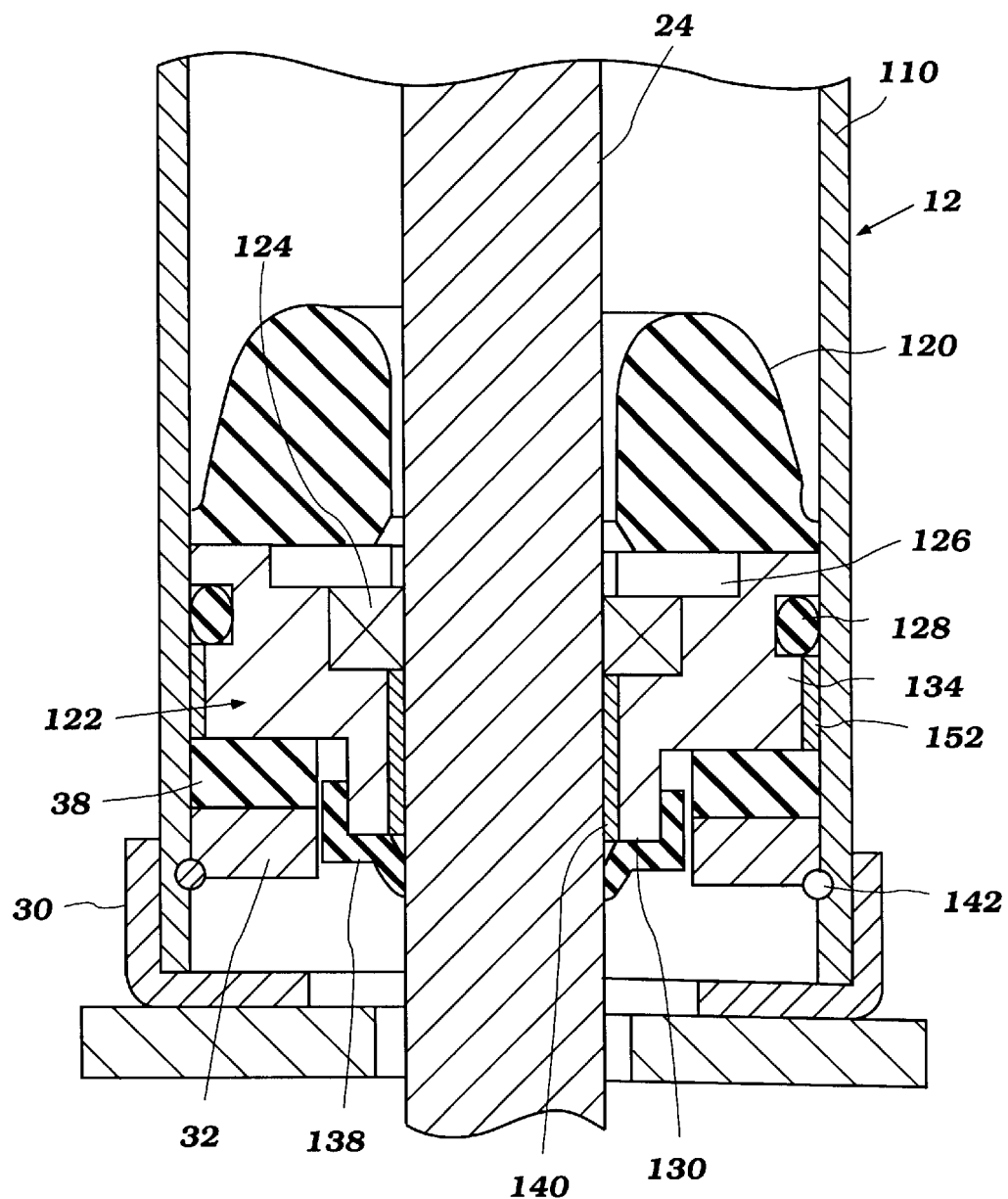
FIG. 7 is a greatly enlarged cross-sectional view of a further damper arranged and configured in accordance with certain features, aspects and advantages of the present invention.

With reference now to FIG. 7, a further arrangement, generally the same as the arrangement of FIG. 6, is illustrated. This arrangement further features an outer sliding surface provided between the disk 122 and the inner wall of the cylinder body 110. The sliding surface generally comprises a bushing 152. In the illustrated arrangement, the bushing 152 is disposed between the sealing member 128 and the compressible member 38. Of course, other positions are also possible; however, in the illustrated arrangement, the bushing 152 replaces a majority of the contact surface area between the disk 122 and the cylinder body 110.

Preferably, the bushing 152 comprises a lubricious material to reduce sliding friction between the disk 122 and the cylinder body 110. The bushing 152 thus facilitates eased sliding action between the two components and results in a slightly more pressure-responsive system. In one preferred arrangement, the bushing 152 is made from a fluorine resin. In other preferred arrangements, the bushing 152 is made from bronze or another lubricious metal. Of course, other types of materials also can be used if desired.

Figure 8:
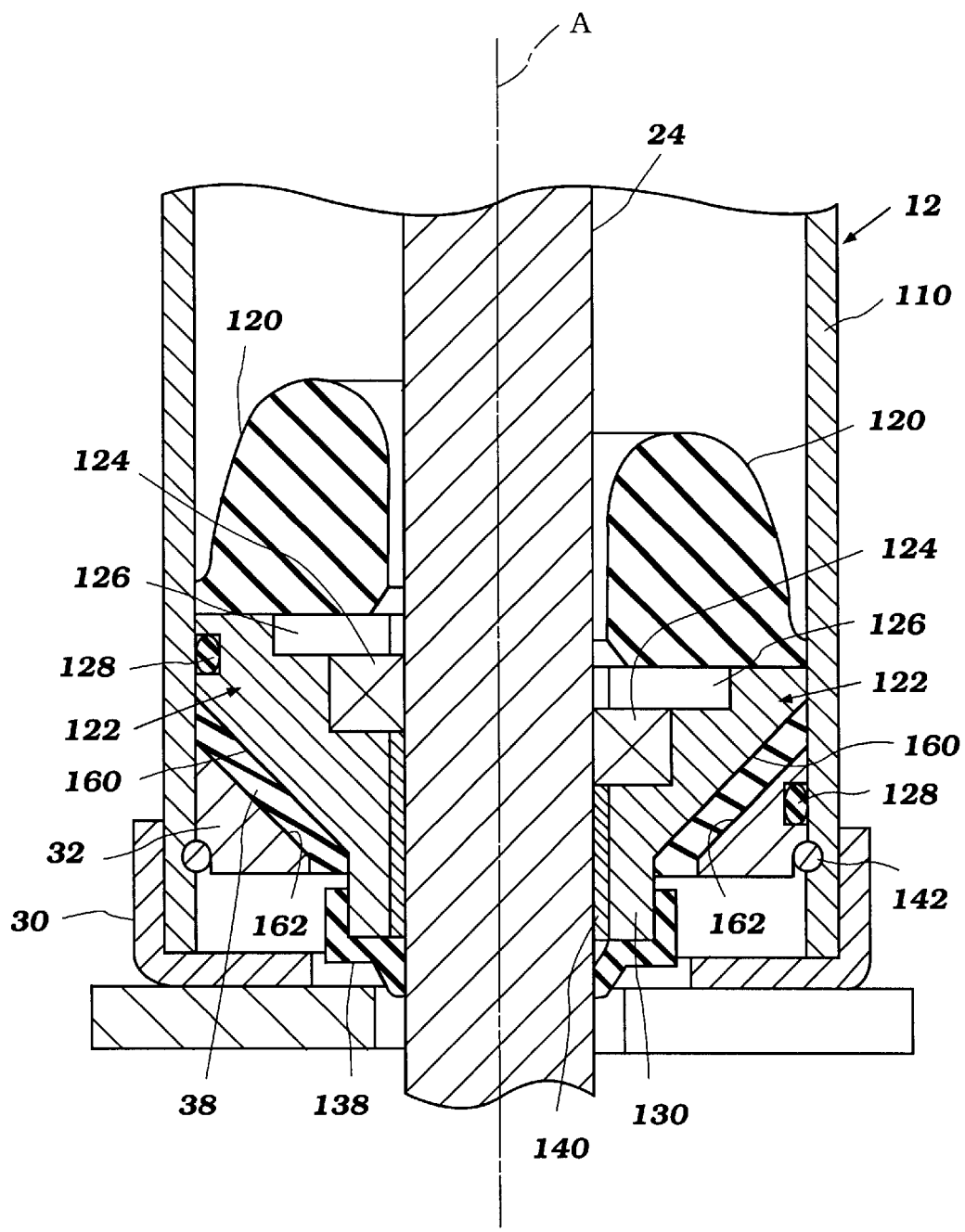
FIG. 8 is a greatly enlarged cross-sectional view of yet another damper arranged and configured in accordance with certain features, aspects and advantages of the present invention.

With reference now to FIG. 8, two further arrangements actually are illustrated in FIG. 8 alone. Generally speaking, the arrangements are similar to the constructions described above. The arrangements vary primarily in the placement of the sealing member 128 and the shape of the disk 122. In particular, the disk 122, rather than being rather cylindrical has been formed in a cone shape. To correspond to the cone shaped disk 122, the compressible member 38 is formed as a hollow cone and is secured in position by the stop 32 which has a complementary cone shaped receptacle.

The arrangements of FIG. 8 advantageously increases the contact surface area between the compressible member 38 and the disk 122 which disperses the pressure over a larger surface and increases the amount of pressure that can be absorbed by the compressible member 38. In other words, the compressible member 38 is positioned between a tapering surface 160 of the disk 122 and a tapering surface 162 of the stop 32. The tapering surfaces have a longer length than surfaces perpendicular to the axial direction A of the damper 12. Of course, in some configurations, the compressible member can be generally wedge shaped such that either said disk 122 or said stop 32 can be cylindrical in shape.

In the arrangements of FIG. 8, the compressible member has an outer surface that is generally flush with the inner surface of the cylinder body 110. In addition, due to the tapering surface 160 of the disk 122, the outer contact surface (i.e., the surface of the disk 122) that contacts the inner wall of the cylinder body 110 has a greatly reduced length such that far less contact surface area between the disk 122 and the cylinder body 110 exists in this arrangement as compared to the arrangement of FIG. 2.

With continued reference to FIG. 8, the sealing member 128 can be disposed about either the disk 122 (as shown on the left side of the damper 12) or the stop 32 (as shown on the right side of the damper 12).

By positioning the sealing member 128 about the stop 32, the axial length of the stop is put to advantageous use while the axial length of the disk 122 can be greatly reduced. Thus, by positioning the sealing member 128 about the stop 32, the axial dimension of the assembly can be further reduced.

In addition, regardless of the position of the sealing member 128, the dust seal 138 preferably is positioned a sufficient distance that the dust seal 138 is not contacted by the compressible member 38 when the compressible member 38 is compressed and the compressible member 38 bulges outward and downward in this arrangement.

Figure 9:
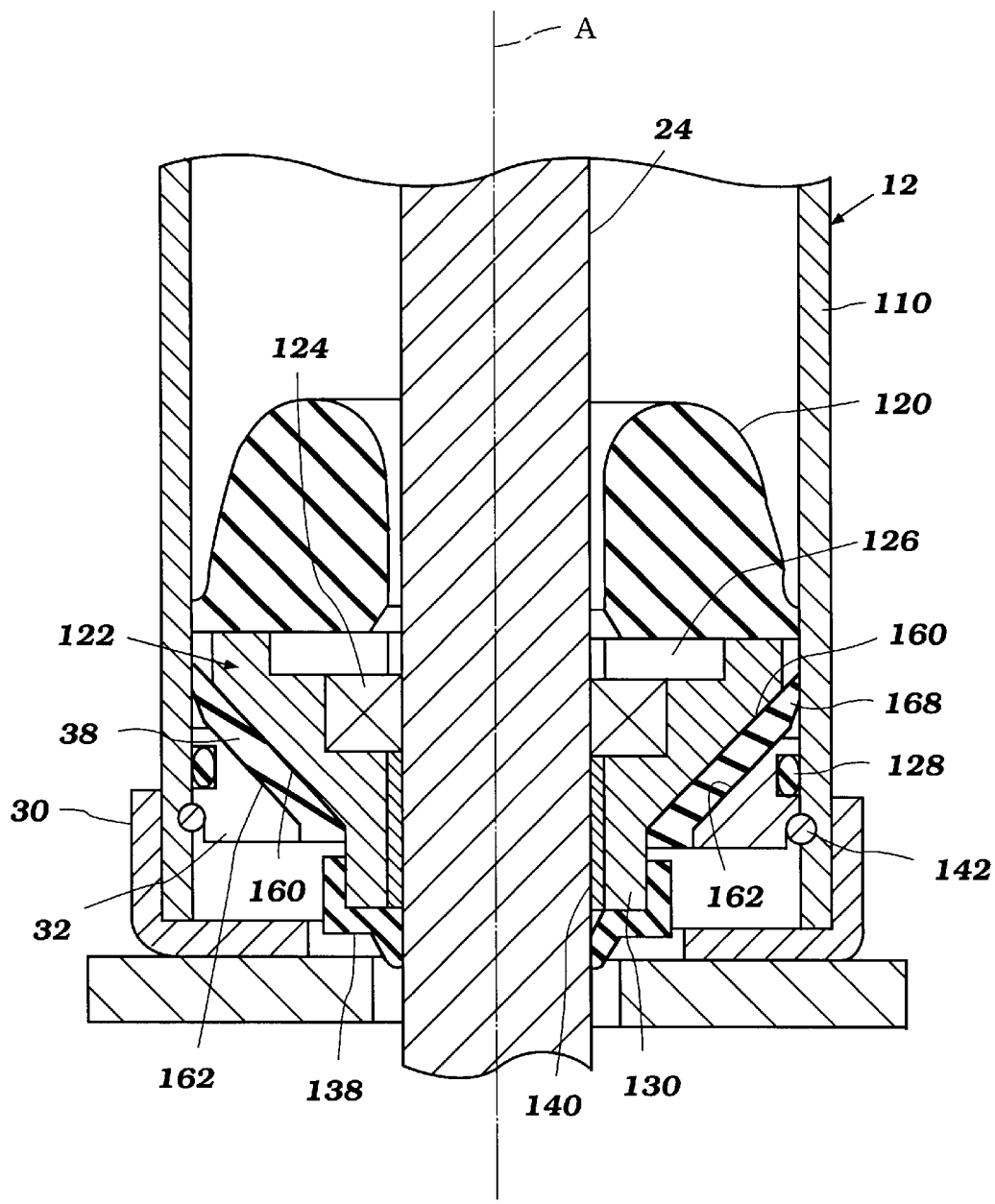
FIG. 9 is a greatly enlarged cross-sectional view of another damper arranged and configured in accordance with certain features, aspects and advantages of the present invention.

With reference now to FIG. 9, a further arrangement is illustrated therein. The arrangement of FIG. 9 is generally similar to the arrangements of FIG. 8; however, in the arrangement of FIG. 9, an outer edge of the compressible member 38 is formed into a acutely angled edge 168.

In addition, in the arrangement of FIG. 9, the sealing member 128 is disposed about a portion of the stop 32. The compressible member, thus, can expand outward and upward as well as inward and downward, which results in a more pressure-responsive arrangement. In addition, by expanding outward, said compressible member can act as an additional seal between said stop and said lower chamber.

Furthermore, in the configuration of FIG. 9, the disk 122 preferably is not in direct contact with the inner wall of the cylinder body. The space between the disk 122 and the cylinder body 110 can be disposed to accept some of the laterally displaced compressible member 38. Thus, the compressible member 38 has more freedom for lateral displacement.

Although the present suspension system has been disclosed in the context of certain preferred arrangements and examples, it will be understood by those skilled in the art that the present suspension system extends beyond the specifically disclosed arrangements to other alternative arrangements and/or uses of the invention and obvious modifications and equivalents thereof. In addition, while a number of variations of the dampers used in the suspension system have been shown and described in detail, other modifications, which are within the scope of the present invention, will be readily apparent to those of skill in the art based upon this disclosure. It is also contemplated that various combination or subcombinations of the specific features and aspects of the arrangements may be made and still fall within the scope of the present invention. Accordingly, it should be understood that various features and aspects of the disclosed arrangements can be combined with or substituted for one another in order to form varying modes of the disclosed suspension system. Thus, it is intended that the scope of the present invention herein disclosed should not be limited by the particular disclosed arrangements described above, but should be determined only by a fair reading of the claims that follow.

What is claimed is:

1. A damper for a suspension system, said damper comprising a cylinder body, a moveable wall disposed within said cylinder body, said cylinder body comprising an outer wall and an end cap, said end cap enclosing a first end of said cylinder body, a first chamber being at least partially defined by said outer wall and said moveable wall, a second chamber being at least partially defined by said outer wall, said end cap and said moveable wall, an axially moveable member positioned within a portion of said second chamber, a compressible member disposed generally between said axially moveable member and said end cap and said compressible member having one surface generally fixed in an axial location relative to said end cap, wherein said moveable wall comprises fluid passages that fluidly connect said first chamber and said second chamber, said fluid passages being selectively blocked by pressure-sensitive valve constructions such that said compressible member is compressible at pressures lower than pressures required to open said valve constructions.

2. The damper of claim 1, wherein said compressible member comprises a rubber damper.

3. The damper of claim 1, further comprising a rod being connected to said moveable wall and extending through said second chamber.

4. The damper of claim 1, further comprising a fluid outlet formed in said first chamber.

5. The damper of claim 1, wherein said valve constructions comprise a plurality of valve discs.

6. The damper of claim 4, wherein said fluid outlet is in fluid communication with a pressure regulator.

7. The damper of claim 6, wherein said pressure regulator is in communication with at least one other damper.

8. The damper of claim 1 in combination with a suspension system comprising at least one other damper, wherein said dampers are fluidly connected through a pressure regulator.

9. A hydraulic damper comprising a cylinder body, a piston reciprocal within said cylinder body, a first chamber defined on a first side of said piston and a second chamber defined on a second side of said piston, said piston comprising at least one passage connecting said first chamber and said second chamber, a pressure-responsive valve regulating flow through said at least one passage, a piston rod being connected to said piston and extending through an end of said cylinder body, a disk positioned between said end of said cylinder body and said piston, said disk also interposed between a stop and said piston and a compressible member interposed between at least a portion of said disk and said stop, wherein said compressible member is compressible at pressures lower than pressures required to open said valve.

10. The damper of claim 9, wherein said stop is interposed between said end of said cylinder body and said compressible member.

11. The damper of claim 9, wherein said disk comprises an inclined surface and said stop has a complementary inclined surface.

12. The damper of claim 11, wherein said compressible member extends radially outward beyond said disk such that said compressible member forms a seal against said cylinder body when said compressible member is compressed.

13. The damper of claim 9, wherein said disk comprises a reduced diameter portion and said compressible member is disposed about said reduced diameter portion.

14. The damper of claim 13, wherein said reduced diameter portion has an outer diameter and said compressible member has an inner diameter when said compressible member is fully compressed and said outer diameter is less than said inner diameter.

15. The damper of claim 14, wherein said outer diameter and said inner diameter of said compressible member when compressed to a limit of the material used to form the compressible member are configured such that said outer diameter is less than said inner diameter.

16. The damper of claim 9, further comprising a dust seal disposed near an end of said cylinder, said dust seal being sufficiently spaced from said compressible member that said compressible member does not contact said dust seal when fully compressed.

17. The damper of claim 16, wherein said compressible member also does not contact said dust seal when said compressible member is compressed to the limit of the material used to form the compressible member.

18. The damper of claim 16 wherein said dust seal extends axially upward into a space defined between said compressible member and said disk.

19. The damper of claim 9 further comprising a friction reducing member disposed between at least a portion of said disk and said cylinder body.

20. A hydraulic damper comprising a cylinder body, a piston reciprocal within said cylinder body, a first chamber defined on a first side of said piston and a second chamber defined on a second side of said piston, said piston comprising at least one passage connecting said first chamber and said second chamber, a pressure-responsive valve regulating flow through said at least one passage, a piston rod being connected to said piston and extending through an end of said cylinder body, a disk positioned between said end of said cylinder body and said piston, said disk also interposed between a stop and said piston, a compressible member interposed between at least a portion of said disk and said stop, and a friction reducing component disposed between said disk and said cylinder body.

21. A hydraulic damper comprising a cylinder body, a piston reciprocal within said cylinder body, a first chamber defined on a first side of said piston and a second chamber defined on a second side of said piston, said piston comprising at least one passage connecting said first chamber and said second chamber, a pressure-responsive valve regulating flow through said at least one passage, a piston rod being connected to said piston and extending through an end of said cylinder body, a disk positioned between said end of said cylinder body and said piston, said disk also interposed between a stop and said piston, a compressible member interposed between at least a portion of said disk and said stop, and a seal positioned about one of said disk and said stop.

22. The damper of claim 21, wherein said seal is positioned about said stop.

23. A hydraulic damper comprising a cylinder body, a piston reciprocal within said cylinder body, a first chamber defined on a first side of said piston and a second chamber defined on a second side of said piston, said piston comprising at least one passage connecting said first chamber and said second chamber, a pressure-responsive valve regulating flow through said at least one passage, a piston rod being connected to said piston and extending through an end of said cylinder body, a disk positioned between said end of said cylinder body and said piston, said disk also interposed between a stop and said piston, a compressible member interposed between at least a portion of said disk and said stop, and a friction reducing member disposed between at least a portion of said disk and said piston rod.

* * * * *